(12) United States Patent
Durgin et al.

(10) Patent No.: US 8,245,037 B1
(45) Date of Patent: Aug. 14, 2012

(54) ENCRYPTION KEY MANAGEMENT

(75) Inventors: Cyrus J. Durgin, Seattle, WA (US);
Pratik S. Dave, New York City, NY (US); Eric J. Martin, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 764 days.

(21) Appl. No.: 12/372,597

(22) Filed: Feb. 17, 2009

(51) Int. Cl.
*H04L 29/06* (2006.01)

(52) U.S. Cl. ........................ 713/167; 380/286

(58) Field of Classification Search ........... 713/193, 713/182, 185, 189, 165–167, 164; 726/2, 726/5, 9, 10, 6, 19; 380/277–279, 286, 45
See application file for complete search history.

(56) References Cited

U.S. PATENT DOCUMENTS

| | | | |
|---|---|---|---|
| 6,877,017 B1 * | 4/2005 | Beom | 1/1 |
| 2008/0219449 A1 * | 9/2008 | Ball et al. | 380/277 |
| 2009/0034733 A1 * | 2/2009 | Raman et al. | 380/277 |
| 2009/0103730 A1 * | 4/2009 | Ward et al. | 380/258 |
| 2009/0300356 A1 * | 12/2009 | Crandell | 713/170 |
| 2009/0316909 A1 * | 12/2009 | Futa et al. | 380/279 |

OTHER PUBLICATIONS

Securing Mobile Ad Hoc Networks with Certificateless Public Keys. Zhang et al. IEEE Computer Society 2006.

* cited by examiner

*Primary Examiner* — Edward Zee
(74) *Attorney, Agent, or Firm* — Kilpatrick Townsend & Stockton LLP

(57) ABSTRACT

Secure information is managed for each host or machine in an electronic environment using a series of key identifiers that each represent one or more secure keys, passwords, or other secure information. Applications and services needing access to the secure information can specify the key identifier, for example, and the secure information currently associated with that identifier can be determined without any change to the code or manual input or exposure of the secure information on the respective device. Functionality such as encryption key management and rotation are inaccessible and transparent to the user. In a networked or distributed environment, the key identifiers can be associated with host classes such that at startup any host in a class can obtain the necessary secure information. Updates and key rotation can be performed in a similar fashion by pushing updates to host classes transparent to a user, application, or service.

26 Claims, 7 Drawing Sheets

| Host Class | Key Identifier | Version |
|---|---|---|
| Host_Class_A | Host_Key_1 | 1 |
| Host_Class_B | Host_Key_2 | 3 |
| Host_Class_C | Host_Key_2 | 5 |
| Host_Class_D | Host_Key_3 | 6 |
| Host_Class_D | Host_Key_4 | 7 |
| Host_Class_E | Host_Key_5 | 4 |
| Host_Class_F | Host_Key_6 | 7 |

ENCRYPTION KEY MANAGEMENT

CROSS-REFERENCE TO RELATED APPLICATIONS

This application is related to co-pending U.S. patent application Ser. No. 12/372,609, filed Feb. 17, 2009, entitled "Distributed Encryption Management," which is hereby incorporated herein by reference.

BACKGROUND

As an increasing amount of information is being stored electronically, and as the number of transactions performed electronically increases, there is an ever increasing need to protect sensitive information in an electronic environment. This includes not only securing the storing and transmitting of information, but also securing access to the information. A common approach is to encrypt information using an encryption algorithm or cipher to encode information such that the information can only be decrypted or otherwise interpreted using the same cryptographic key. Managing these cryptographic keys has been a challenge for many organizations for years. In order to improve security and minimize the risk that information will be accessed by an unauthorized user obtaining one of these keys, a unique key can be used for each instance of information. For example, a first unique key might be used to transmit a piece of information, a second unique key might be used to store the information, and a third unique key might be needed to obtain access to the information. Alternatively, a separate key can be used for each piece of data that is stored or transmitted. Such an approach generally does not scale well and presents further challenges with managing the keys in this scenario. Further, there can be several such pieces of information in any given system, such as credit card information, user data, database passwords, access keys, etc.

A potential problem presents itself in that these keys and other such security items must be stored and maintained in a secure fashion. Essentially, the keys themselves become the equivalent classification of the sensitive information those keys are protecting. Some previous approaches hardcoded passwords into application binaries that needed to securely access a resource such as a database, but this is a weak and ineffective obfuscation technique with the password then viewable not only by the programmer entering the password into the application, but also to any user able to access the source code. Such approaches also typically require manual entry of each password on each device, as well as manual rotation of the passwords on each device. Various insecurities arise as the number of people having access to secure objects, including keys or passwords, increases. Further, if material is to be re-encrypted at various times using different secure objects, then the re-encryption also has to be done manually and generally increases the number of people having access to the secure objects. Certain programming languages such as Java provide functionality that allows a user to store sensitive information in a relatively secure fashion. Unfortunately, such approaches tend to be tightly coupled to the programming language or technology, and cannot easily be used with outside technology and are still largely ineffective.

Another problem with managing sensitive information is that generating code to implement cryptography effectively is very difficult. There are a number of different cryptographic approaches and algorithms, and it is difficult to know when it is advantageous to use each approach. While certain third party toolkits are available that assist with such coding and encryption, these toolkits are still relatively complex and require managing several toolkits to obtain all the desired functionality. Further, not all toolkits have been subjected to lengthy cryptanalysis so may prove to be a poor implementation once an expensive investment has been made to use the toolkit.

Even if an encryption solution is selected, there still are disadvantages to many such approaches in that higher security levels require a periodic rotation or changing of encryption keys. Thus, it is typically necessary to manually adjust the keys used for encryption. Such an approach can be particularly complex in a distributed environment with a number of devices that each must obtain the key.

BRIEF DESCRIPTION OF THE DRAWINGS

Various embodiments in accordance with the present disclosure will be described with reference to the drawings, in which:

FIG. 6 illustrates a table of host classes and corresponding key identifiers that can be used in accordance with one embodiment;

FIG. 7 illustrates a display enabling a security user to assign key identifiers to host classes in accordance with one embodiment.

DETAILED DESCRIPTION

Figure 1:
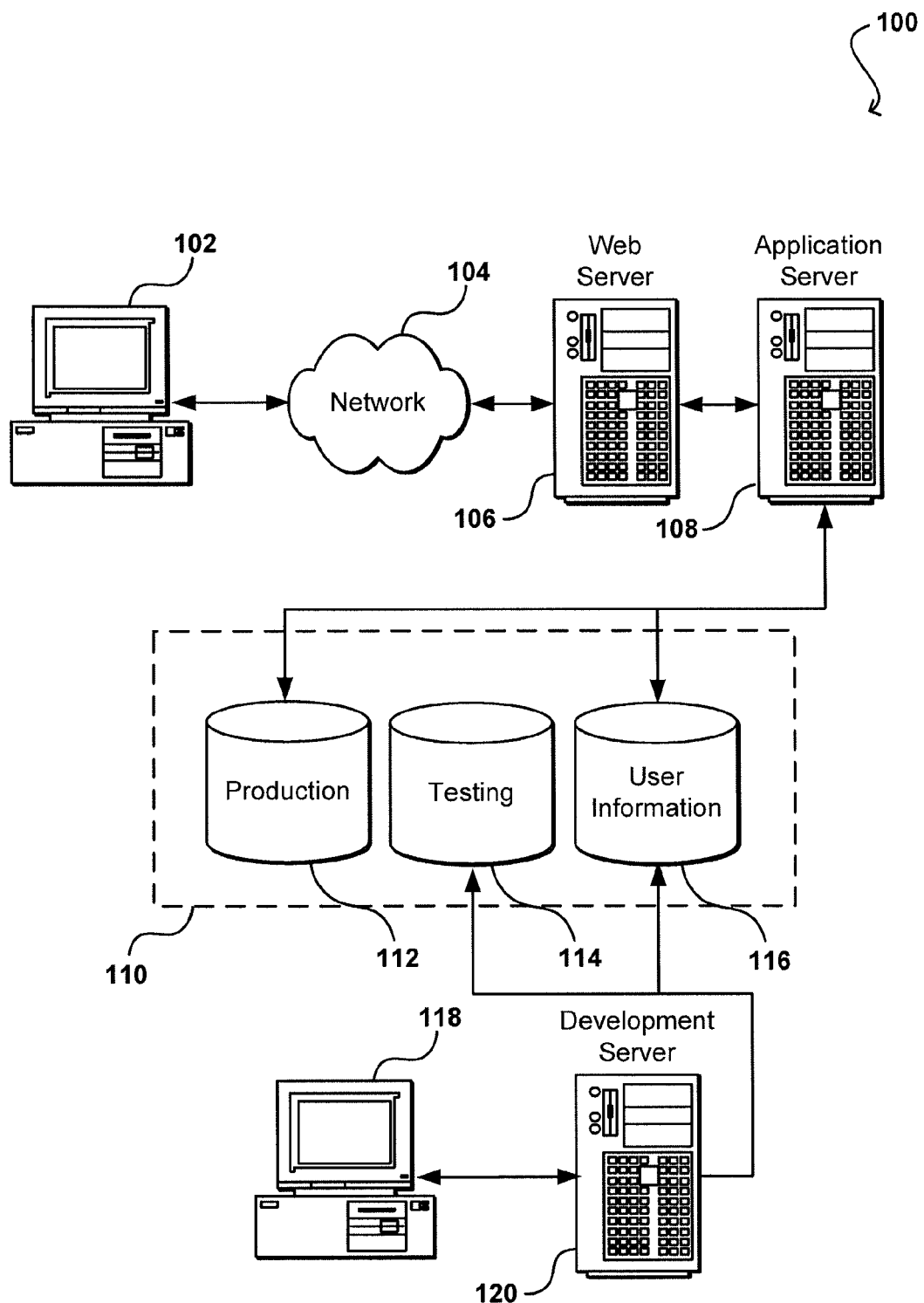
FIG. 1 illustrates an environment in which various embodiments can be implemented.

Systems and methods in accordance with various embodiments of the present disclosure may overcome one or more of the aforementioned and other deficiencies experienced in conventional approaches to managing sensitive information and/or resources in an electronic environment. In particular, a key identifier (sometimes known as a token) or other such secure identifier can be used to represent one or more secure keys, passwords, or other secure objects or pieces of sensitive information. A secure object may not only include an encryption key or secure password, for example, but in some embodiments can also include information about how to use the key or password, as well as information identifying an algorithm or other process or procedure to be used with the key or password. By using a token, for example, to represent the secure information, that information can be updated, rotated, or otherwise changed without any significant impact on the services, applications, hosts, or users relying on that information. Further, the tokens can be discoverable without exposing the underlying secure objects associated therewith. For example, a key identifier can correspond to a key ring that includes a set of encryption keys or other such secure keys. A version number or other identifier can be used to specify one of those keys to be used at any given time for that key identifier, without the specifying entity having to provide or even know the actual key being specified. In other embodiments, one of the keys of the ring can be set as a default key for a period of time such that a secure operation can be performed by specifying just the key identifier, without a version number or other such information. A security-related task, operation, or function can be performed using the key identifier whether or not a service, application, device, or user performing the task is aware of the current key. In many cases, the entity performing the task may be unaware that the security information has changed, and may have no way of determining the secure information. The changes and maintenance relating to the secure information can be performed transparent to the user or other such entity. Such an approach allows the secure objects to be maintained, rotated, etc., without being exposed to a user.

Further, the sensitive information can be handled for multiple hosts or other such entities in a distributed or networked environment. A security service or application, for example, can store and manage sensitive information in a centralized manner. Each host for which sensitive information is being managed can be assigned to one or more host classes, and each host class can have one or more key identifiers associated therewith. In this way, each host can obtain the appropriate information simply by sending a request identifying the host class(es) to which that host belongs. Hosts can easily be added to the system as each host can send a request to a security service at startup, for example, and can automatically receive the necessary security information for the appropriate host class(es). The host class information also can be used to automatically push updates or rotates keys for the various identifiers, in an automatic manner that can be transparent to any users, applications, or services.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2. In this example, an end user device 202 is able to connect through a network 204 to access at least one host or server 206. The server might have access to at least one data repository 208 for use in serving requests from the user device 202. As discussed elsewhere herein, there can be several types of security used with respect to the user device 202 and the server 206 or database 208, which may be controlled by a security administrator device 210 able to configure and manage security for the server, host, and any related components. For example, the user might send a request for content or a resource that needs to be decrypted by the server 206. In another example, the server might require secure authentication of the user device 202 in order to provide access to services or functionality provided by the server, and may require different security criteria to access and/or store data in the data repository 208. Further, any service and/or application may also require separate security criteria. Various other types of security can be utilized as discussed and suggested elsewhere herein.

Systems and methods in accordance with various embodiments can provide for the management of various security aspects for such components. In one embodiment, objects such as secure keys for a variety of services, hosts, users, etc., can be stored securely utilizing a key identifier for each such object. By using a key identifier, applications and services can be developed without exposing the actual secure key information to anyone. Once the secure key is stored in a secure location and a corresponding key identifier is defined, the secure key information can be accessed only through managed software outside human intervention, although in some embodiments an authorized user may be able to obtain access in certain situations. Such an approach can provide a hands-off and language-agnostic way of dealing with matters such as cryptography and sensitive keys.

Figures 2, 3:
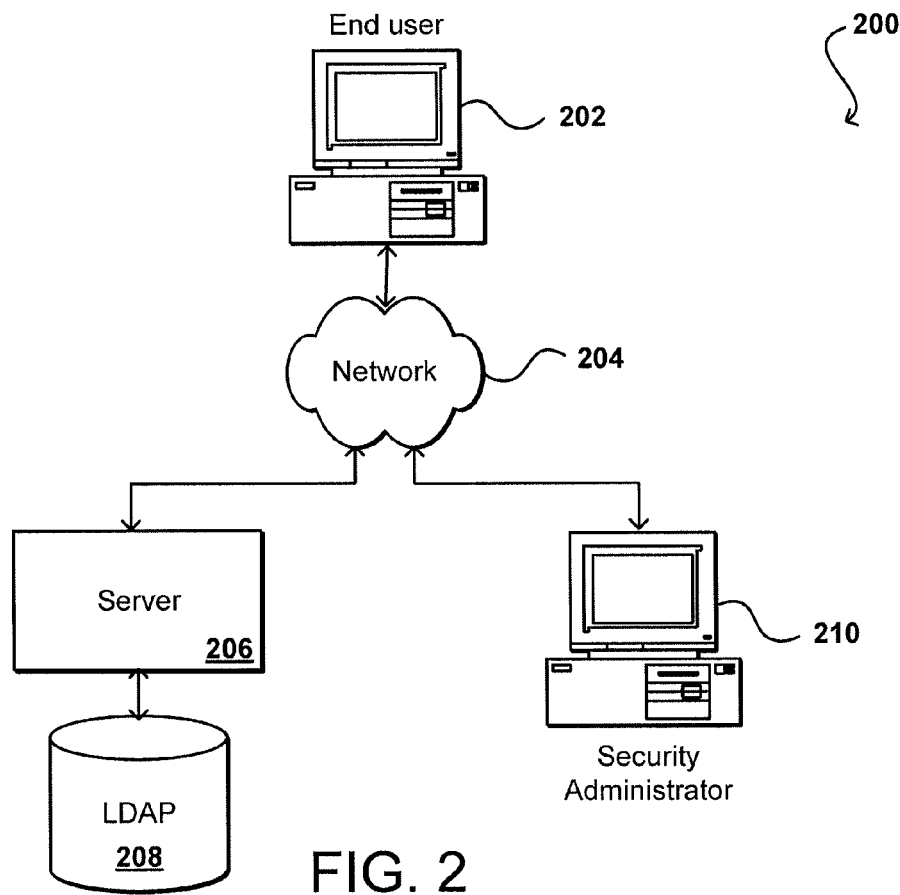
FIG. 2 illustrates a configuration for specifying secure information that can be used in accordance with one embodiment.
FIG. 3 illustrates an example of a table of key identifiers that can be used in accordance with one embodiment.

Another advantage to such an approach is that the actual secure key associated with a key identifier can be changed without the need to change the key identifier used by an application, service, or user, for example, as such a change would otherwise require pushing change information to a large number of locations and ensuring that each location successfully received and implemented the change. In one example, each key identifier includes version information that can be used to specify the current secure key associated with that identifier. For example, FIG. 3 illustrates a table 300 wherein several key values 306 are specified for a single key identifier 302. As can be seen, each key value 306 corresponds to a version 304 of the corresponding key identifier 302. Thus, one of the key values 306 can be specified by passing the key name and the appropriate version number. In this embodiment, one of the versions and/or key values is specified as the default 308. Thus, the current key value might be accessible simply by specifying the key name for the key identifier without further specifying a version number.

Further, such an approach allows for large amounts of data or information to be periodically re-encrypted without manual intervention. In some embodiments, data can be re-encrypted upon the changing of a default key, although any other appropriate period or time point can be used as should be apparent. In any case, the information can be re-encrypted without manual intervention or exposing a secure object outside the software and/or system.

In one example, a user can ask to perform a task such as encrypting or decrypting content simply by passing the appropriate key name as a parameter value from a command line or an appropriate user interface. In some embodiments, an application programming interface (API) can be defined such that an application can pass the appropriate key name and/or version number to the key management service or module, without the user of the application ever having to know anything about the key information. As discussed, a call can be made through the API that does not include a serial number, and in such a case either the default or preferred value can be used or, in some cases, the appropriate value with be otherwise determined or specified. For example, an application can be configured to always use the key available with the highest version number, or using any similar approach.

Figure 4A:
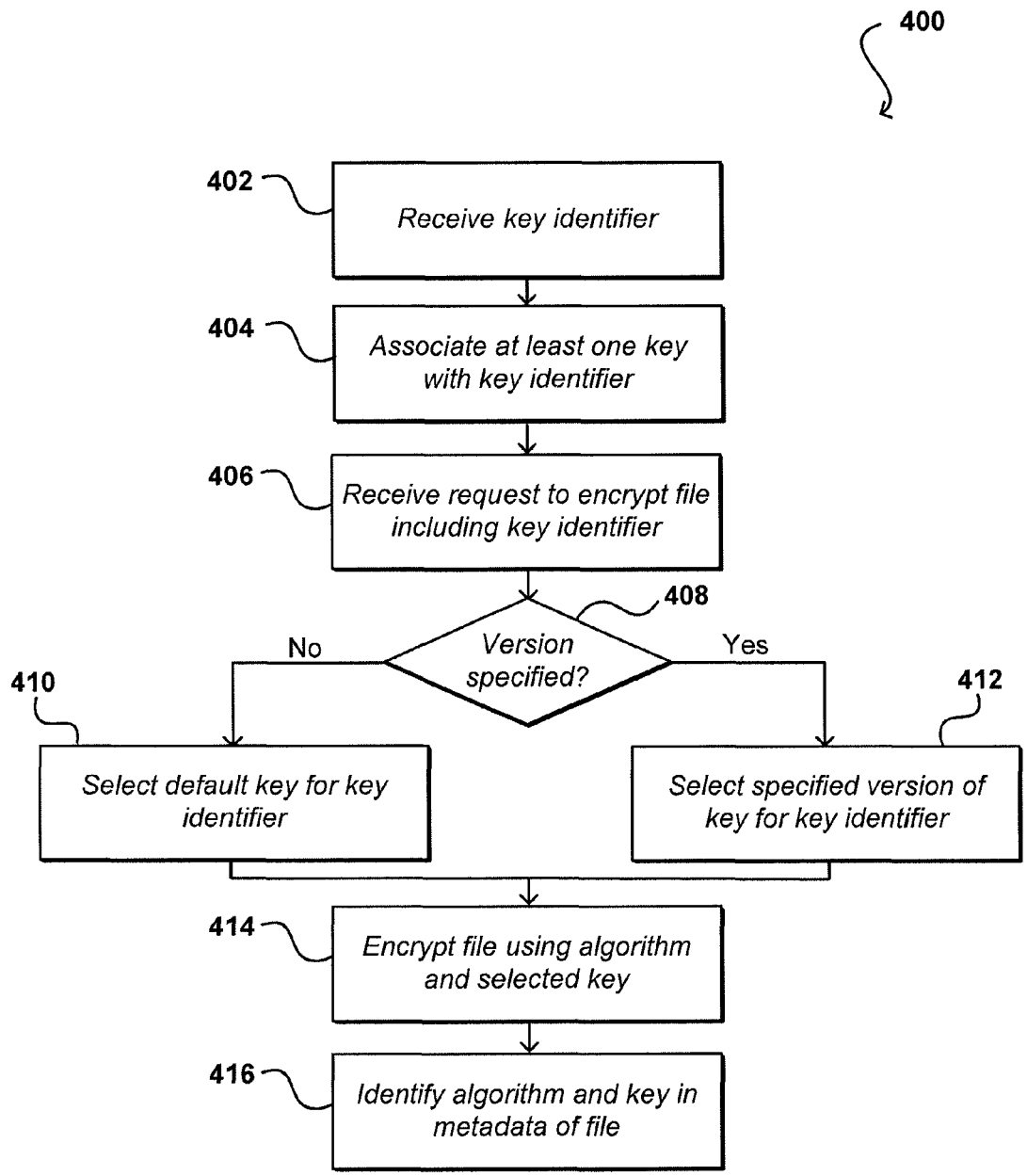
FIGS. 4(a) and 4(b) illustrate processes for encrypting and decrypting files using key identifiers in accordance with one embodiment.

FIG. 4(a) illustrates an example process 400 for encrypting a file in accordance with one embodiment. It should be understood that similar procedures can be used to perform other security-related tasks as discussed or suggested elsewhere herein. In this example, a security service or application receives a key identifier 402 (or other such security identifier) from a security administrator, end user, application, or other such source. At least one key (or other piece of secure information) is associated with the key identifier 404. As discussed, a number of different keys can be associated with any given key identifier, and the current key to use can be defined in any of a number of ways, such as the highest numbered version or a key flagged as the current default key. The security service can store the keys and associated key identifiers in an appropriate data repository or other such location.

Once the keys and key identifiers are entered into and/or available to the security service, any appropriate request for a secure operation using that key identifier can be processed by the service. In this example, a request is received to encrypt a file using a specific key identifier 406. In some embodiments the request itself will specify the key identifier, while in other embodiments the key identifier could be identified by the host, service, or another appropriate source, such that the user or source of the request does not need to be aware of the key identifier. A determination can be made as to whether the key identifier has a version or particular key identified 408. If no version or key is identified, then the current default key for the key identifier can be selected 410. If a version is identified, then the identified key can be selected 412. The file identified by the request then can be encrypted using an appropriate encryption algorithm and the selected key 414. In some embodiments the algorithm is specified by the security service, while in other embodiments the algorithm used can be selected by the user, algorithm, service, or any other entity operable and authorized to select algorithms offered by the security service. Identification information for the algorithm and the key used for the encryption can be stored in the metadata or other content of the encrypted file 416, such that any host or service having access to the key and algorithm can decrypt the file.

Thus, an advantage of such an approach is that the encryption information does not need to be passed back to the user or application. When an encrypted document or file is returned to a user, or otherwise stored for access, information such as the encryption algorithm and key identifier used to encrypt the document can be included with the file itself. This not only saves the effort of having to send the information to the user for the user to maintain, but also allows any authorized recipient of the document (such as another host) to decrypt the document if that recipient device, system, or application has the appropriate algorithm and access to the key specified in the metadata. A user or application can therefore cause a document or other such object to be decrypted simply by providing the document to a host or other receiving device having the necessary information, without separately providing a key identifier or version information, as the information is already included in the metadata and the content is thus able to be automatically decrypted. Such an approach can be particularly beneficial when the key associated with a key identifier changes, as the host can automatically determine the current key value and perform the decryption. A security application or service thus can provide a simply set of APIs that can be used to encrypt and/or decrypt arbitrary blocks of data.

Figure 4B:
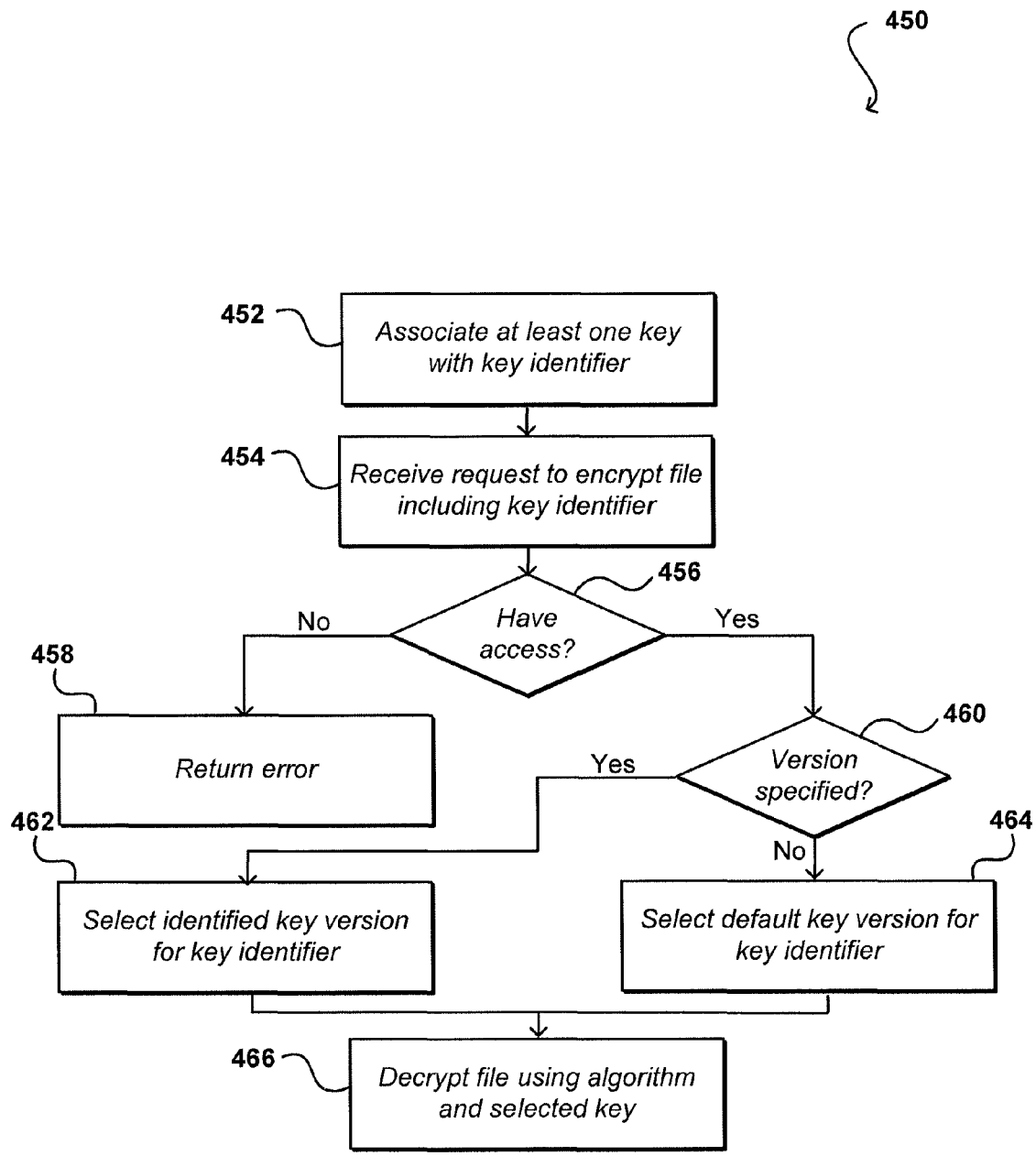

FIG. 4(*b*) illustrates one such process 450 for decrypting a file in accordance with one embodiment. In this example a host, service, application, or other such component receives the key identifier and each key to be associated with the key identifier 452. A request to decrypt a file, encrypted using a process such as that described with respect to FIG. 4(*a*), can be received from a user or other such source 454. The request does not need to include any information about the security of the file. The receiving component can analyze the metadata (or other specified content) of the file to determine the key identifier and algorithm used to encrypt the file, and determine whether the component has access to the algorithm and key information 456. If the component does not have access, then the component can return an error message or perform a similar such task in response to the request 458. For example, the system in one embodiment is able to audit or flag unauthorized attempts at access. Such an approach allows a providing entity to analyze the attempts at access and determine potential security risks. If the component does have access, the component can determine whether a version or particular key of the identifier has been specified 460. If a particular version is specified for the key identifier, the component can select the identified key 462. If not, the component can select the default key to use for decryption 464. Once a key is selected, the component can decrypt the file using the determined algorithm and selected key 466. In this way, any host can decrypt a file if that host is authorized for the decryption, whether or not the user, application, or other source making the request has any knowledge of the security information.

As discussed, it can be desirable to change the key values that are used to encrypt content, provide access, or otherwise secure information. Another advantage to the use of key identifiers and version numbers is that a security service or application can provide for the management of key rotation. A user such as a security administrator can specify that new keys are to be introduced at specific intervals, and at least some of these keys can be reused at different times in some cases. Using an approach such as that discussed with respect to FIG. 3, new key values can be added, updated, and/or deleted from an association with a key identifier, such that the actual key value can be rotated or changed at any appropriate time. In other technologies that store keys by name, logic must be developed to rotate keys, or the rotation must be done manually. In various embodiments discussed herein, keys are identified by both an identifier and a version number whereby the version number can be configured to be incremented or otherwise rotated automatically. Such an approach allows a set of keys, passwords, or other secure objects to be associated with a single name or identifier, typically to be used to a single function or set of functions, such that the actual objects can be rotated and/or updated periodically with minimal effort.

A security application or service in accordance with one embodiment organizes secret information such as passwords or keys into logical groups referred to herein as "key rings." A key ring might include a password for a data repository, as well as all of the past passwords and any known future passwords. Any of these passwords then can be set as the default or preferred password at any time. A key ring in one embodiment is stored on each host belonging to a specified host class for that key ring. If the key ring stores eight different passwords, for example, each of these passwords can be given a number such as a number from zero to seven. Any of these passwords then can be specified for purposes of encryption or decryption, for example, simply by supplying the key ring identifier. If desired, a corresponding key number can be specified to indicate which key on the ring to be used. Otherwise, a preferred, default, or current key on the ring can be used, such as may be tagged by a security administrator or administration application.

When changing the key of the ring to be used, or otherwise performing key rotation or updating, a new key can be pushed out to each host or other appropriate component as necessary. The new key can be used once that key is distributed to all the appropriate hosts. In conventional systems using key names, it is difficult and complex to make sure each necessary host receives and implements the key, as hosts can be offline or there can be any of a number of other reasons. In embodiments described herein, even hosts in a large distributed systems can continue to use the old key associated with the key identifier until the new key is distributed. Thus, a host can start decrypting information using key seven, for example, while other hosts without the latest key continue using key six in the meantime. The system advantageously does not need to track or be aware of the version or key each host is using, as all hosts simply continue to use the same key identifier. Further, the previous key can remain the preferred key in some embodiments until all hosts have the new key, at which point the new key can be designated the preferred key. Some hosts allow querying such that it is possible to determine which key rings each host has, as well as the current keys and/or versions for each ring. Functionality such as key monitoring and snap shots can be provided in order to quickly determine which hosts have which keys and the states of those keys at any given time. While many examples discussed herein refer to hosts and host implementation, it should be understood that this is merely an example and that various other devices, components, applications, and services can utilize such functionality as described and suggested herein.

As discussed, a user can encrypt content simply by passing the content to a host that can extract the algorithm and key information from the metadata and decrypt the content accordingly, without the user providing such information or even necessarily being aware of the security information. An approach in accordance with one embodiment also allows a user to perform specific functionality in a similar fashion, without providing the necessary security information. For example, just as a user can use an API to ask an application or service to encrypt a file, for example, a user can use an API to request a connection to a data repository, Web service, or any other component with which the user can establish a connection. The user does not have to enter or submit a script to be executed, but can simply submit a request for connection and the application or service can utilize the appropriate security information to establish a connection on behalf of the user, as the application or service knows the current password needed to establish the connection. The user thus does not need to know anything about the encryption or security criteria used.

In some embodiments, the keys for each key identifier are each manually entered once on each machine, and the software manages the keys from that point forward. Each machine thus acts as a standalone security terminal, receiving and storing the keys and maintaining the local copy. In order to ensure that the security software is on each machine, the software in some embodiments is manually installed. In other embodiments, the software can be distributed or "pushed" out to any new machines across a network, cluster, or other grouping of devices. In some embodiments, a new machine will ask for configuration information at startup. Updates to the security software can be pushed out or distributed in a similar fashion.

Since the hosts or other machines on the network are able to receive software and updates in a distributed manner, approaches in accordance with several embodiments take advantage of, and build on, such functionality to provide for automatic and transparent key distribution. The ability to automatically distribute and maintain keys across a group of devices can be particularly desirable for applications such as cloud computing, where services are offered from a scalable set of devices and the number of devices can be increased or decreased as needed. Such an approach also allows for all keys to be stored at a "centralized" location, with each host or machine only receiving and storing a local copy of those keys needed by, or approved for, that machine.

Figure 5:
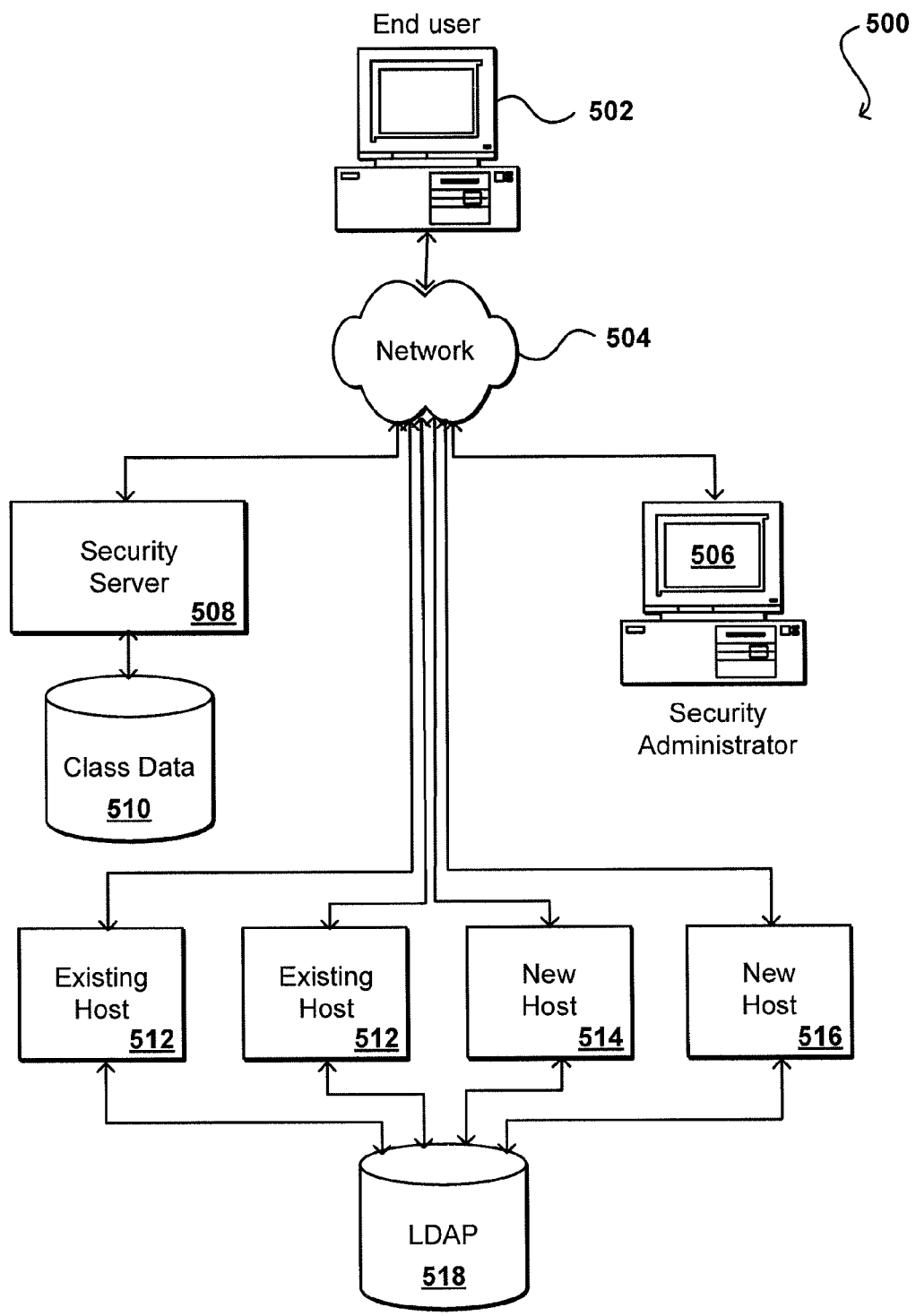
FIG. 5 illustrates a configuration for specifying secure information in a distributed environment that can be used in accordance with one embodiment.

FIG. 5 illustrates a configuration 500 of components that can take advantage of such functionality in accordance with one embodiment. In this example, an end user device 502 can make a request across a network 504 for a service, for example, which can be served by an existing host 512 of the system receiving the request. Although not shown, it should be understood that there can be a number of other components used for purposes such as routing or load balancing as would be apparent to one of ordinary skill in the art. Each of the existing hosts 512 can have stored a local copy of the keys needed for the services offered by that host. The keys can be distributed and/or managed by a security server 508 or other such device, which can store key information in a data repository 510 or other such device.

In one embodiment, each existing host 512 is assigned to at least one host class. An example of a host class corresponds to all servers for the United States serving display pages for items in an electronic marketplace. If a host offers a specified set of services, for example, then that server can be assigned to a specific host class. Each server can belong to one or more host classes. The security server 508 can maintain at least one host class access control list (ACL) that can be used to specify which hosts are to have access to each key identifier. Thus, a security administrator 506 can enter each key into central security data store 510 and can specify at least one host class to receive or have access to the key. A developer or administrator can assign each new host to at least one host class, such that at startup the new host can contact the security service with a list of its host classes. The security server then can use the ACL to determine which keys to transmit to the new host. Such an approach allows only the necessary keys to be distributed to each server, while the keys do not have to be manually entered on each device. In the example, new host 514 might belong to the class that is able to serve the request from the end user device 502, and thus would have received the necessary key(s) after startup. If new host 516 does not belong to the class able to serve the request, then host 516 would not have the key needed (unless the key was also used for another class) and thus could not serve the request from the end user device. In one embodiment, each host might belong to a common class, such as a class that enables each host to receive the key(s) needed to access a central data repository, such as an Lightweight Directory Access Protocol (LDAP) database 518. An LDAP database can include, for example, all information needed to manage the hosts across the network, and thus can also include the class data information shown to be stored separately in FIG. 5. When a new host is provisioned the host can contact a set of services at startup to receive configuration information such as the host name, Internet Protocol (IP) address, users or user groups authorized to have access, host class, and other such information that makes the host unique. At least one of the services contacted at start time can be a security service offered by the security server 508 that is able to receive the host class information from the host and return the necessary key information to the host. This can include, for example, a set of key rings and/or key identifiers such as is discussed above with respect to FIG. 3.

FIG. 6 illustrates an example of a host class access control list (ACL) 600 that can be used in accordance with one embodiment. In the list, there is at least one entry for each host class 602 having at least one key managed by the system. For each entry (e.g., row) in the ACL, there is a key identifier 604 indicating a key identifier that should be available to each member of the corresponding host class 602. In this example, the ACL also stores the current version 606, default, preferred key, or other information used to determine which key on a ring, for example, to be used as the current key. As should be apparent, a number of other related information such as the actual keys for each identifier also can be stored in an ACL in other embodiments.

FIG. 7 illustrates an example of a user interface screen or page 700 that can be generated for display in accordance with one embodiment. In this example, an authorized user such as a security administrator is able to specify a host class 702 for which to manage at least one key. For the specified host class 702, the user can also specify information such as at least one key identifier 704 to be available to that host class, and in some cases a current version number 706, default, preferred key, or other information used to determine which key corresponding to the identifier should be used as the current key. The result of the input can be an updated ACL accessible to the security service. Each of the entries can be viewed as a rule to be applied when granting access to a host. A similar screen (not shown) can be used to allow an authorized user to query or otherwise determine the keys, key identifiers, or other such information managed for each host, host class, user, or other appropriate entity. Such an interface also can allow for reporting or other such functionality which can help with issues such as auditing encryption information or ensuring compliance.

Figures 8A, 8B:
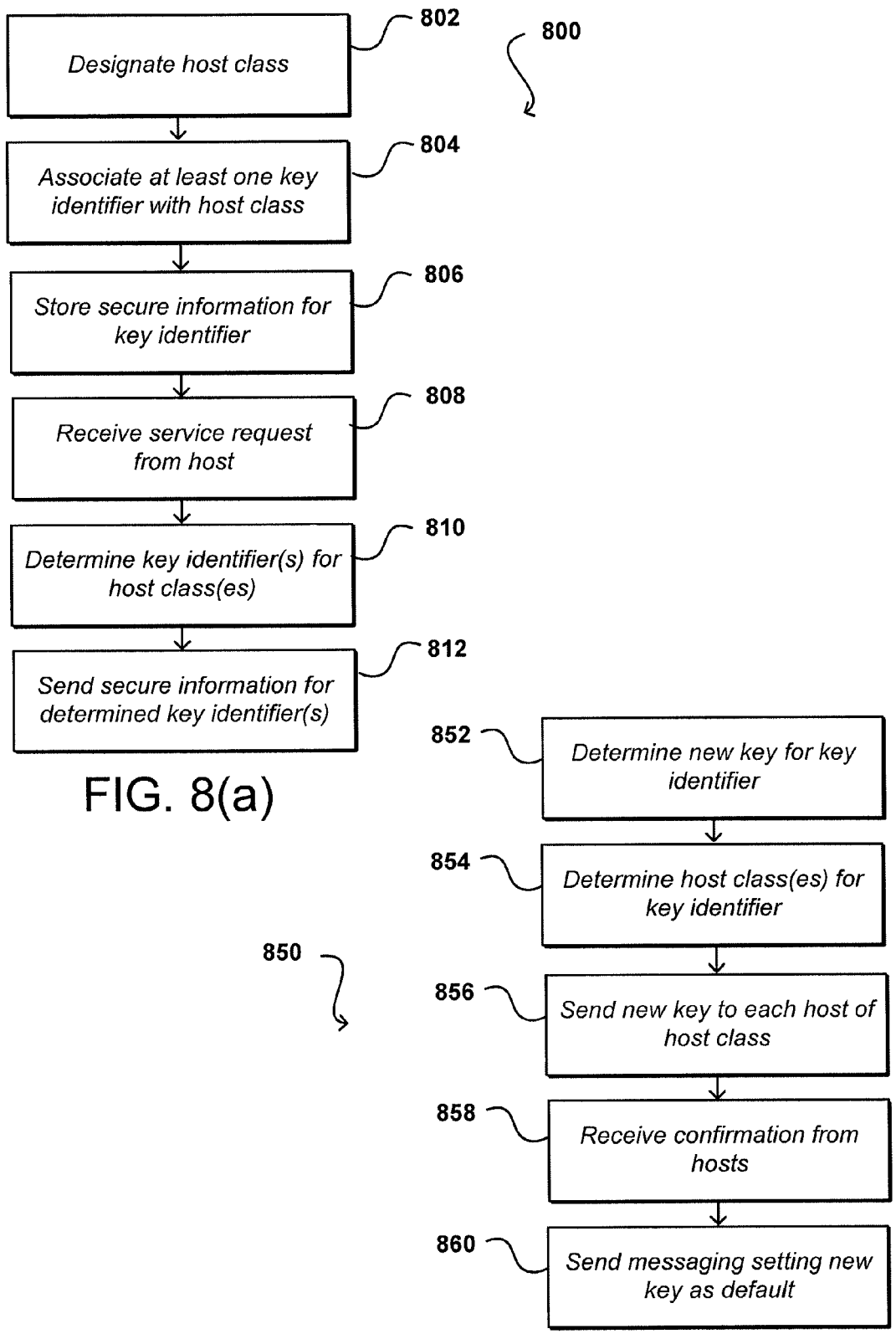
FIGS. 8(a) and 8(b) illustrate processes for sending and updating sensitive information to multiple hosts in accordance with one embodiment.

A system in accordance with one embodiment is operable to push out the updated information to each host to which the change applies. For example, as described with respect to FIG. 7, a security administrator can update an ACL which can cause different keys to be associated with different key classes. FIG. 8(a) illustrates steps of an example process 800 for first associating the key information and pushing that information out to the appropriate hosts. As discussed, at least one host class is designated 802 and at least one key identifier is associated with each class 804. The associations and information can be maintained by a security service or application as discussed herein, and the secure information such as keys or passwords can be stored for each key identifier 806. A service request subsequently can be received from a host 808 for which secure information is being maintained. Such a request can be received at any appropriate time, such as when a server is first brought online, restarts, checks for periodic updates, or at any other such time. Using information such as an IP address from which the request is received, the host classes for the host from which the request is received can be identified, such as by making a call into a centralized LDAP database. Using the determined host class identification(s), the security service can determine the key identifier(s) for each host class 810, and can send the corresponding secure information for each of the key identifiers to the host 812.

After the host receives the secure information, it can be desirable to update the information as necessary. In one embodiment, any change saved to an ACL can cause a request or other communication to be sent, to each host of an affected host class, that includes the changes applicable to that host. FIG. 8(b) illustrates steps of an example process 850 for pushing out such information in accordance with one embodiment. In this example, a new key is determined for a key identifier 852, such as when a security administrator adds or rotates a key for a key identifier. Other changes can also occur, such as a new key ring being made available to a host class or a key being no longer available to a host class. The security service or application can determine the relevant host class(es) affected by the change 854, and can send the new key (or other update, change, or delete information) to each of the hosts of the identified host class(es) 856. In some embodiments it is desirable to ensure that each host in a host class receives the updated information before activating or relying upon the updated information. Thus, the security service can be configured to receive a confirmation from each of the hosts to which the updates were sent 858. The confirmation can be any appropriate confirmation, such as a confirmation message or other such communication. After a confirmation is received from each of the hosts, a subsequent message or communication can be sent to each of the hosts indicating that the new key can be set as default or otherwise utilized accordingly 860. In the meantime, hosts can continue to use the current value(s).

In some cases, the security service can include logic that allows a security administrator to configure a rotation of keys for a given host class at particular times. The rotation can be done automatically and/or manually, and the system can include logic to help determine when to rotate keys. In some embodiments, certain actions can cause keys to be changed automatically, such as unauthorized access or other such events. The changing of keys can be transparent to the average user, such that no one other than a security administrator or other such person need to even know that a rotation occurred. The change is done behind the scenes in a way that is not only transparent to the user, but also to most applications and/or services that use the key information. The key identifiers do not change, so no change is necessary in the code, etc., to adapt to the change. Further, no manual intervention is needed in most cases.

Such an approach can be advantageous for environments such as cloud computing, for example, where additional servers can be added into a group or cluster of servers at any time to provide a specified service or function. In conventional systems, each new server requires the passwords for a database, service, etc., to be entered manually at startup. If each server at startup is instead given at least one host class name, then each server can contact the security service to obtain the necessary security information as part of an automatic deployment process. The security service can store the secure information in any appropriate manner, such as by using a redundant and/or distributed data repository that is able to securely store sensitive material such as encryption keys, passwords, credentials, etc. The security service provides an interface and/or application layer on top of this data repository that includes logic to specify and/or determine which keys belong to which classes, hosts, devices, users, etc. As discussed, secure objects such as secure keys, passwords, or credentials can be used to perform any of a variety of secure functions, or security-related functions, such as encrypting or decrypting content, providing secure digital signatures, obtaining secure connections, accessing secure information, and securely storing information.

In some embodiments, host classes can be nested and/or part of a class hierarchy. For example, a host class might include servers of Web pages, while a child class might includes servers of Japanese Web pages. Thus, a host might be assigned to a host class that actually includes multiple "subclasses" that are part of that host class. In such a case, child class can inherit any appropriate keys from the respective parent class. Such an approach can simplify management of each host, reduce the amount of storage needed for key information, and reduce the amount of bandwidth and/or network traffic needed to distribute updates to the various host classes. Hosts can inherit and/or be assigned host class membership in various ways described herein or apparent to one of ordinary skill in the art. Each host in a given class then can automatically receive the same information. Further, hosts outside that class do not receive the information and are not able to access the information or resources.

In one embodiment, the security service is provided as a service to which outside users can subscribe. For example, a user or party might want the service to maintain specific security information. The user or party then might be presented with a special ACL control screen, Web interface, or other such user interface that allows the user to enter and update the distribution of the secure information. Such a service then can be billed to the user or party in any appropriate manner, such as by the amount of secure data stored, amount and/or type of access, bandwidth, number of users or hosts, or any other appropriate billing approach known or used in the art for subscriptions and/or services.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, Ruby, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing secure objects in a computing device, comprising:
   storing, at the computing device, one or more secure objects for performing a secure operation;
   associating one or more secure identifiers with the one or more secure objects;
   associating one of the one or more version numbers with a particular one of the one or more secure objects associated with one of the one or more secure identifiers, the one or more secure objects being associated with at least one of the one or more version numbers;
   receiving, at the computing device, a request to perform the secure operation, the request identifying a particular one of the one or more secure identifiers to be used in performing the secure operation;
   as a result of the request including a particular one of the one or more version numbers for identifying a version of the one or more secure objects to be used in performing the secure operation, selecting a particular one of the one or more secure objects corresponding to the particular one of the one or more secure identifiers and associated with the particular one of the one or more version numbers;
as a result of the request not including a version number for identifying the version of the one or more secure objects to be used in performing the secure operation, selecting a current default secure object corresponding to the particular one of the one or more secure identifiers; and
performing the secure operation at the computing device using the selected secure object.

2. A method according to claim 1, further comprising:
changing the current default secure object corresponding to the secure identifier,
wherein the request to perform the secure operation is able to be processed using the secure identifier independent of the change in the current default secure object.

3. A method according to claim 1, further comprising:
when the secure operation for the request relates to encrypted content to be processed, determining whether the encrypted content includes a version number for the secure identifier to be used in performing the secure operation.

4. A method of performing a secure operation on a computing device, comprising:
receiving, at the computing device, a request to perform a secure operation, the request identifying a secure identifier to be used in performing the secure operation;
determining a secure object associated with the secure identifier to perform the secure operation, the secure identifier being associated with one or more secure objects for the secure operation;
as a result of the request including a version number for identifying a version of the secure object to be used, performing the secure operation at the computing device using the determined secure object based at least in part on the included version number,
wherein the secure object to be used to perform the secure operation is able to be changed by the computing device based at least in part on the version number, and
wherein the request to perform the secure operation identifies the secure identifier independent of a change in the secure object to be used to perform the secure operation; and
as a result of the request not including a version number, performing the secure operation at the computing device using a default secure object.

5. A method according to claim 4, wherein the one or more secure objects includes at least one of an encryption key or a password.

6. A method according to claim 4, further comprising:
when the request includes a version number, selecting the secure object corresponding to the secure identifier and associated with the version number;
when the request does not include a version number, selecting a current default secure object corresponding to the secure identifier.

7. A method according to claim 4, wherein the secure identifier is associated with the request by at least one of the request specifying the secure identifier and the computing device determining the secure identifier for the request.

8. A method according to claim 4, wherein the secure operation is selected from the group consisting of encrypting, decrypting, re-encrypting, securely storing, digitally signing, and providing secure access to at least one of a resource or content.

9. A method according to claim 4, wherein the secure operation includes encrypting content, and further comprising:
encrypting content associated with the request using a determined algorithm and the selected secure object; and
storing information identifying the determined algorithm and the selected secure object in the encrypted content, wherein a computing device having access to the determined algorithm and the selected secure object is able to decrypt the content using the information stored in the encrypted content.

10. A method according to claim 9, wherein the information is stored in metadata of the encrypted content.

11. A method according to claim 4, further comprising:
periodically changing a default secure object associated with the secure identifier.

12. A method according to claim 4, further comprising:
storing each secure object to a storage facility available to the computing device and associating each secure object with a secure identifier,
wherein after each secure object is associated with a respective secure identifier the secure object is not exposed outside the storage facility.

13. A method according to claim 4, further comprising:
defining an interface wherein an application is able to send the request, including the secure identifier, from a client device independent of a user of the application having knowledge of the secure identifier.

14. A method of decrypting content, comprising:
receiving, at a computing device, a request to decrypt content identified by the request;
extracting information from the content identifying a secure identifier and an algorithm used to encrypt the content, wherein the request does not specify the secure identifier and the algorithm used to encrypt the content;
when the computing device has access to the secure identifier and the algorithm, determining a secure object associated with the secure identifier by determining whether a version number is identified in the request;
as a result of the request identifying a version number, decrypting the content using a particular version number of the secure object and the algorithm, and providing access to the decrypted content, the secure object being based at least in part on the particular version number; and
as a result of the request not identifying a version number, decrypting the content using a default secure object and the algorithm, and providing access to the decrypted content.

15. A method according to claim 14, wherein determining a secure object associated with the secure identifier includes extracting an object version from metadata identifying an appropriate secure object.

16. A method according to claim 14, further comprising:
when the computing device does not have access to at least one of the secure identifier and the algorithm, returning a response indicating that the computing device is unable to decrypt the content.

17. A system for performing a secure operation, comprising:
a processor; and
a memory device including instructions that, when executed by the processor, cause the processor to:
receive a request to perform a secure operation, the request identifying a secure identifier;

determine a secure object associated with the secure identifier, the secure identifier being associated with one or more secure objects for the secure operation;

as a result of the request including a version number for identifying a version of the secure object to be used, perform the secure operation at the computing device using the determined secure object based at least in part on the included version number, wherein the secure object to be used to perform the secure operation is able to be changed by the computing device, and wherein the request to perform the secure operation identifies the secure identifier independent of a change in the secure object to be used to perform the secure operation; and as a result of the request not including a version number, performing the secure operation at the computing device using a default secure object.

18. A system according to claim 17, wherein the instructions, when executed by the processor, further cause the processor to:

when the request includes a version number, select the secure object corresponding to the secure identifier and associated with the version number;

when the request does not include a version number, select a current default secure object corresponding to the secure identifier.

19. A system according to claim 17, wherein the secure operation includes encrypting content, and wherein the instructions, when executed by the processor, further cause the processor to:

encrypt content associated with the request using a determined algorithm and the selected secure object; and store information identifying the determined algorithm and the selected secure object in the encrypted content, wherein a computing device having access to the determined algorithm and the selected secure object is able to decrypt the content using the stored information.

20. A system according to claim 19, wherein the information is stored in metadata of the encrypted content.

21. A system according to claim 17, wherein the instructions, when executed by the processor, further cause the processor to:

change a current default secure object associated with the secure identifier, wherein the request to perform the secure operation is able to be processed using the secure identifier independent of the change in the current default secure object.

22. A computer program product embedded in a non-transitory computer-readable medium including processor-executable instructions for performing a secure operation, comprising:

program code for receiving, at a computing device, a request to perform a secure operation, the request identifying a secure identifier;

program code for determining a secure object associated with the secure identifier to perform the secure operation, the secure identifier being associated with one or more secure objects for the secure operation;

program code for performing, as a result of the request including a version number for identifying a version of the secure object to be used, the secure operation at the computing device using the determined secure object based at least in part on the included version number, wherein the secure object to be used to perform the secure operation is able to be changed at the computing device, and wherein the request to perform the secure operation identifies the secure identifier independent of a change in the secure object to be used to perform the secure operation; and program code for performing, as a result of the request not including a version number, the secure operation at the computing device using a default secure object.

23. A computer program product according to claim 22, further comprising:

program code for, when the request includes a version number, selecting the secure object corresponding to the secure identifier and associated with the version number;

program code for, when the request does not include a version number, selecting a current default secure object corresponding to the secure identifier.

24. A computer program product according to claim 22, wherein the secure operation includes encrypting content, and further comprising:

program code for encrypting content associated with the request using a determined algorithm and the selected secure object; and program code for storing information identifying the determined algorithm and the selected secure object in the encrypted content, wherein a computing device having access to the determined algorithm and the selected secure object is able to decrypt the content using the stored information.

25. A computer program product according to claim 22, wherein the information is stored in metadata of the encrypted content.

26. A computer program product according to claim 22, further comprising:

program code for changing a current default secure object associated with the secure identifier, wherein the request to perform the secure operation is able to be processed using the secure identifier independent of the change in the current default secure object.

* * * * *